United States Patent
Li et al.

(10) Patent No.: US 9,982,078 B2
(45) Date of Patent: May 29, 2018

(54) COPOLYMER CONTAINING RESIDUES OF VINYLBENZYL HALIDE AND VINYLBENZYL ALCOHOL AND SYNTHESIS THEREOF, POROUS STRUCTURE COMPRISING THE COPOLYMER AND PRODUCTION THEREOF, AND POROUS CARBON SPHERE

(71) Applicant: National Taipei University of Technology, Taipei (TW)

(72) Inventors: Chia-Chen Li, Taipei (TW); Sheng Yang, Taipei (TW); Yu-Ju Tsou, Taipei (TW)

(73) Assignee: National Taipei University of Technology, Taipei (TW)

( * ) Notice: Subject to any disclaimer, the term of this patent is extended or adjusted under 35 U.S.C. 154(b) by 0 days. days.

(21) Appl. No.: 15/415,885

(22) Filed: Jan. 26, 2017

(65) Prior Publication Data
US 2017/0283532 A1 Oct. 5, 2017

(30) Foreign Application Priority Data
Mar. 30, 2016 (TW) .............................. 105110039 A

(51) Int. Cl.
*C08F 212/14* (2006.01)
*C08J 9/28* (2006.01)
(Continued)

(52) U.S. Cl.
CPC .......... *C08F 212/14* (2013.01); *C01B 31/089* (2013.01); *C08F 212/08* (2013.01);
(Continued)

(58) Field of Classification Search
CPC .............................. C08F 212/08; C08F 212/14
See application file for complete search history.

(56) References Cited

U.S. PATENT DOCUMENTS

| 4,384,095 A | 5/1983 | Reed et al. |
| 5,725,869 A | 3/1998 | Lo |

FOREIGN PATENT DOCUMENTS

| CN | 1304055 | 3/2007 |
| CN | 102029133 | 4/2011 |

(Continued)

OTHER PUBLICATIONS

Peter Krajnc et al., "4-Vinylbenzyl chloride based porous spherical polymer supports derived from water-in-oil-in-water emulsions", Reactive and Functional Polymer, 65 (2005), Nov. 2005, 37-45.

(Continued)

*Primary Examiner* — Alexandre F Ferre
(74) *Attorney, Agent, or Firm* — JCIPRNET

(57) ABSTRACT

A copolymer, a method for producing the copolymer, a porous structure formed by the copolymer, a method for producing the porous structure, and a porous carbon sphere formed by carbonizing the porous structure are shown. The copolymer has a chemical structure of formula (1) or (2):

(Continued)

-continued

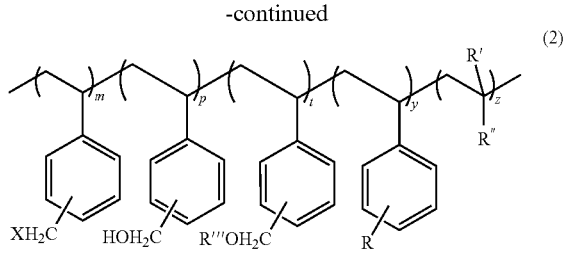

(2)

wherein the molecular weight of the copolymer structure is 120,000 or less g/mole, m and t are both greater than 0, 8%≤p≤80%, y≥0, z≥0, and X is selected from —Cl, —Br and —I.

22 Claims, 8 Drawing Sheets

(51) Int. Cl.
  *C08F 212/08* (2006.01)
  *C01B 31/08* (2006.01)

(52) U.S. Cl.
  CPC ........... *C08J 9/283* (2013.01); *C01P 2004/32* (2013.01); *C01P 2004/61* (2013.01); *C01P 2006/16* (2013.01); *C08J 2201/0502* (2013.01); *C08J 2325/14* (2013.01); *C08J 2325/18* (2013.01)

(56) References Cited

FOREIGN PATENT DOCUMENTS

| CN | 102718204 | 10/2012 |
| CN | 103800292 | 5/2014 |
| CN | 103043649 | 4/2015 |
| CN | 103374143 | 8/2015 |

OTHER PUBLICATIONS

Chia-Chen Li et al., "Newly Designed Copolymers for Fabricating Particles with Highly Porous Architectures", Chem. Mater., Aug. 2016, 1~7.

COPOLYMER CONTAINING RESIDUES OF VINYLBENZYL HALIDE AND VINYLBENZYL ALCOHOL AND SYNTHESIS THEREOF, POROUS STRUCTURE COMPRISING THE COPOLYMER AND PRODUCTION THEREOF, AND POROUS CARBON SPHERE

CROSS-REFERENCE TO RELATED APPLICATION

This application claims the priority benefit of Taiwan application no. 105110039, filed on Mar. 30, 2016. The entirety of the above-mentioned patent application is hereby incorporated by reference herein and made a part of this specification.

BACKGROUND OF THE INVENTION

Field of the Invention

The invention relates to a copolymer and synthesis and application thereof, and particularly relates to a copolymer at least including residues of vinylbenzyl halide and vinylbenzyl alcohol, a method for producing the copolymer, a porous structure comprising the copolymer, a method for producing the porous structure, and a porous carbon sphere formed from a spherical form of the porous structure.

Description of Related Art

Conventional methods for preparing porous microspheres can substantially be classified into two types. One includes mixing a porogen in an organic monomer and homogenizing the product in an incompatible solution (such as water) into spherical oil droplets, and then polymerizing the monomer in the oil droplets. In the process, the polymerization conditions of the monomer in the oil droplets need to be controlled, and porous microspheres are obtained after the polymerization and drying. Since running of the polymerization reaction needs to be considered in this process of preparing porous microspheres, the kinds of the reactants used and the operation techniques involved are too complex, that is, the user needs to possess good understanding in chemistry or have training in polymerization reactions, otherwise the polymerization reaction of the monomer occurring in the oil droplets at the same time of the formation of the porous structure is difficult to control. Moreover, introducing a porogen in the polymerization reaction may make the components too complex such that the polymerization efficiency is affected, or the pore-forming efficiency of the porogen is reduced. As a result, inconsistent pore morphology or incomplete structure occurs.

As a traditional method for preparing a porous structure, for instance, a method has been disclosed by Dejan et al in "4-Vinylbenzyl chloride based porous spherical polymer supports derived from water-in-oil-in-water emulsions", *Reactive and Functional Polymer*, 65 (2005) 37-45. The method forms a porous structure mainly through a water-in-oil-in-water (W/O/W) double-emulsion method using vinylbenzyl chloride (VBC) as a monomer. U.S. Pat. No. 5,725,869 also discloses a method for producing a porous structure, which emulsifies an organic solvent containing a polymer and a plasticizer via an oil-in-water (O/W) method in an aqueous phase containing an emulsifier, and volatilizes the organic solvent in the end to form a porous structure.

Another common method for preparing porous microspheres is the template method, which uses another material as a sacrificial template. After the template and the host material form a spherical structure, the template is dissolved to form a porous structure indirectly. Since the method has a long and complex operating process and uniformity of dispersion of the sacrificial template in the host material is hard to control, the final pore distribution is affected. Moreover, the use of a template significantly increases the material cost and the time cost.

The formability of the porous microspheres produced by the above method is poor, and issues such as that the solvent is not easily removed, that the corrosive solvent easily causes pollution, and that the particle size distribution of the microspheres is too wide are present, and therefore under the social conditions of increased environmental awareness, an emphasis on being environmentally friendly, and a focus on production costs and economic benefits, when the operating method and the components are too complex and issues such as greater quality instability and poor yield exist, additional production costs are generated and technical difficulty for implementation is increased.

Accordingly, it is desired to develop a polymer material that allows a porous microstructure to be produced simply by dissolving the polymer in a solvent, emulsifying the resulting solution into spheres and volatilizing the solvent, so that the drawbacks of preparing a porous microstructure using a monomer in prior art, which include tedious and complex technical aspects of the polymerization of a monomer in forming the porous structure, and difficulty of large-scale production, etc., are avoided.

SUMMARY OF THE INVENTION

The invention provides a copolymer and a production method thereof. The chemical structure of the copolymer at least contains residues of a vinylbenzyl halide and vinylbenzyl alcohol. By using the copolymer, a porous microstructure such as porous microspheres can be formed without using a porogen or a sacrificial template material. Moreover, the production of the porous structure using the copolymer can be completed at normal temperature and pressure. As a result, not only complex experiment steps are not needed, but also porous microspheres with a uniform structure are easily produced.

The pore distribution and the size of the porous microspheres formed by the copolymer of the invention can be easily adjusted in a homogenization process by simply changing process parameters (such as the proportion of the polymer, the solvent or the surfactant), the connectivity between the pores of the formed porous structure is good, and the porosity of the microspheres can be greater than 65% approximately. The invention is simpler and can be easily implemented as compared to other methods of preparing porous microspheres.

The copolymer of the invention has a number-average molecular weight of 120,000 g/mole or less, wherein the range 55,000 g/mole or less provides a wider selection for the solvent so that a uniform porous structure can be more easily produced. Moreover, with the invention, porous structures having more uniform pores can be produced from the copolymer at a specific content ratio of the vinylbenzyl halide residue to the vinylbenzyl alcohol residue. In some embodiments, the copolymer can further contain residues of monomers other than the vinylbenzyl halide and vinylbenzyl alcohol to obtain a porous structure having better pores and sphericity.

In an embodiment, the copolymer of the invention has a chemical structure of formula (1). In another embodiment, the copolymer of the invention has a chemical structure of formula (2). Each of formula (1) and formula (2) contains at least residues of the vinylbenzyl halide and vinylbenzyl alcohol.

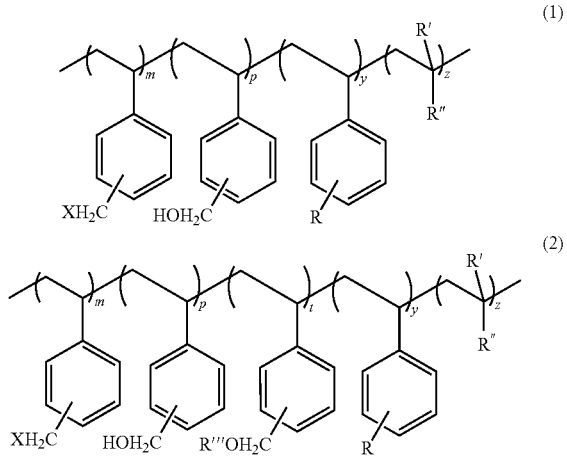

In particular, the number-average molecular weight of the copolymer having a chemical structure of formula (1) or (2) is 120,000 g/mole or less, m and t are both greater than 0, and 8%≤p≤80%. In particular, in the composition of the copolymer having a chemical structure of formula (1) or (2), y and z can be independently equal to or greater than 0. Moreover, in the two chemical structure, X can be selected from chlorine (—Cl), bromine (—Br) and iodine (—I), R can be selected from hydrogen (—H), chlorine (—Cl), bromine (—Br), alkyl (—$C_nH_{2n+1}$), and other substituents such as —$CH_2OC_nH_{2n+1}$, —$CH_2NH_2$, —$CH_2C(=O)OC_iH_{2i+1}$, —$CH_2OC(=O)C_nH_{2n+1}$, —$NH_2$, —$N(C_iH_{2i+1})C(=O)C_nH_{2n+1}$, —$C(=O)OC_iH_{2i+1}$, —$OC(=O)C_nH_{2n+1}$, —$SO_3M$ (wherein M can be selected from —H, —Na, —K and —$NH_4$), and —$Si(OC_nH_{2n+1})_3$, R' can be selected from —H, —OH and —$C_nH_{2n+1}$, R'' can be selected from —H, —$C(=O)OC_jH_{2j+1}$, —$OC(=O)C_kH_{2k+1}$, —$C\equiv N$, —$Si(OC_nH_{2n+1})_3$, —$NH_2$, —$N(C_iH_{2i+1})C(=O)C_nH_{2n+1}$, —$NC_4H_6O$ (pyrrolidonyl), and —$C_6H_5N$ (pyridinyl), and R''' can be selected from —$C_nH_{2n+1}$, wherein the numeric ranges of the above parameters are as follows: n=1 to 4, i=0 to 4, j=1 to 12, and k=1 to 17.

The method for producing the above copolymer of the invention includes the following steps. An initiator and a water-containing solvent are mixed in a container to form a starting solution. At least one monomer is added in the starting solution to form a mixed solution, wherein the at least one monomer includes a vinylbenzyl halide. A polymerization reaction is caused in the mixed solution at a reaction temperature. The product of the polymerization reaction is precipitated in another solvent to obtain the copolymer, wherein the copolymers have the chemical structure of formula (1) or (2) and the structural parameter ranges thereof.

The porous structure of the invention has a body that has a plurality of pores and includes a copolymer having the chemical structure of formula (1) or (2) and the structural parameter ranges thereof.

A method for producing a porous structure of the invention includes the following steps. The copolymer having the chemical structure of formula (1) or (2) is dissolved in an organic solvent to form an organic-phase mixed solution. An aqueous solution containing a surfactant is provided. The organic solution is emulsified in the aqueous solution. Then, heating is performed to gradually volatilize the organic solvent so that a plurality of porous structures is naturally formed as suspended in the aqueous solution. Solid powder having the porous structures can be obtained via simple steps such as washing with water, filtering, and drying.

The invention also provides a porous carbon sphere that is formed by carbonizing the spherical porous structure formed by the above method of the invention, which has a size ranging from 5 to 25 μm and a pore size of 0.1 μm or larger.

In order to make the aforementioned and other objects, features and advantages of this invention comprehensible, certain embodiments accompanied with figures are described in detail below.

DESCRIPTION OF THE EMBODIMENTS

Two embodiments are provided here for the copolymer of the invention that at least contains residues of a vinylbenzyl halide and vinylbenzyl alcohol (VBA). The two copolymers according to the two embodiments have a chemical structure of formula (1) and a chemical structure of formula (2), respectively.

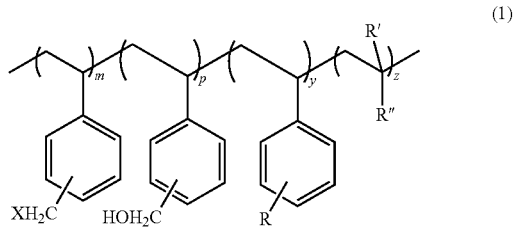

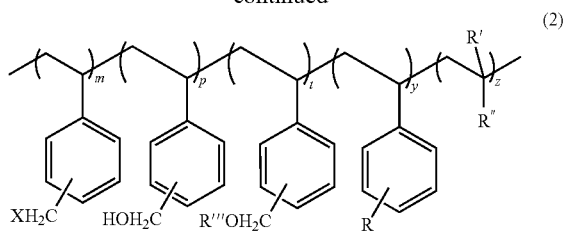

(2)

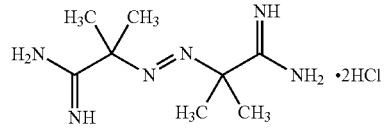

(3)

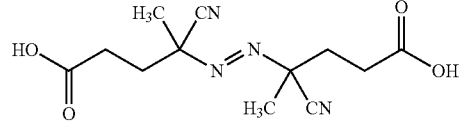

(4)

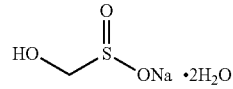

(5)

In particular, the number-average molecular weights of the two copolymers are both 120,000 g/mole or less, preferably between 10,000 g/mole and 120,000 g/mole, m and t are both greater than 0, and 8%≤p≤580%. In particular, in the composition of the copolymer having the chemical structure of formula (1) or (2), y and z can be independently equal to or greater than 0. Moreover, in the chemical structures of the two copolymers: X can be selected from —Cl, —Br and —I, R can be selected from hydrogen (—H), —Cl, —Br, —$C_nH_{2n+1}$, and other substituents such as —$CH_2OC_nH_{2n+1}$, —$CH_2NH_2$, —$CH_2C(=O)OC_iH_{2i+1}$, —$CH_2OC(=O)C_nH_{2n+1}$, —$NH_2$, —$N(C_iH_{2i+1})C(=O)C_nH_{2n+1}$, —$C(=O)OC_iH_{2i+1}$, —$OC(=O)C_nH_{2n+1}$, —$SO_3M$ (wherein M can be one of —H, Na, —K, and —$NH_4$), and —$Si(OC_nH_{2n+1})_3$, R' can be selected from —H, —OH and —$C_nH_{2n+1}$, R" can be selected from —H, —$C(=O)OC_jH_{2j+1}$, —$OC(=O)C_kH_{2k+1}$, —C≡N, —Si$(OC_nH_{2n+1})_3$, —$NH_2$, —$N(C_iH_{2i+1})C(=O)C_nH_{2n+1}$, —$NC_4H_6O$ (pyrrolidonyl) and —$C_6H_5N$ (pyridinyl), and R''' is —$C_nH_{2n+1}$. The numeric ranges of the above parameters are as follows: n=1 to 4, i=0 to 4, j=1 to 12, and k=1 to 17.

Each of the copolymers is capable of carrying fine water droplets into the oil droplets in a subsequent emulsification process for preparing a porous structure via the hydrophilicity of the VBA residue in the chemical structure thereof, such that a porous structure is obtained at the end.

In an embodiment, when the copolymer of formula (1) or (2) satisfies the range of 15%≤p≤65%, the pores of the porous structure produced by using the copolymer are more uniform. Moreover, in an embodiment, the number-average molecular weight of the copolymer of formula (1) or (2) can be set in the range 55,000 g/mole or less, preferably between 20,000 g/mole and 55,000 g/mole, to increase the selection range of the organic solvent capable of dissolving the copolymer.

In another embodiment, when R" has a larger chain length, z is allowed to be larger.

Figure 1:
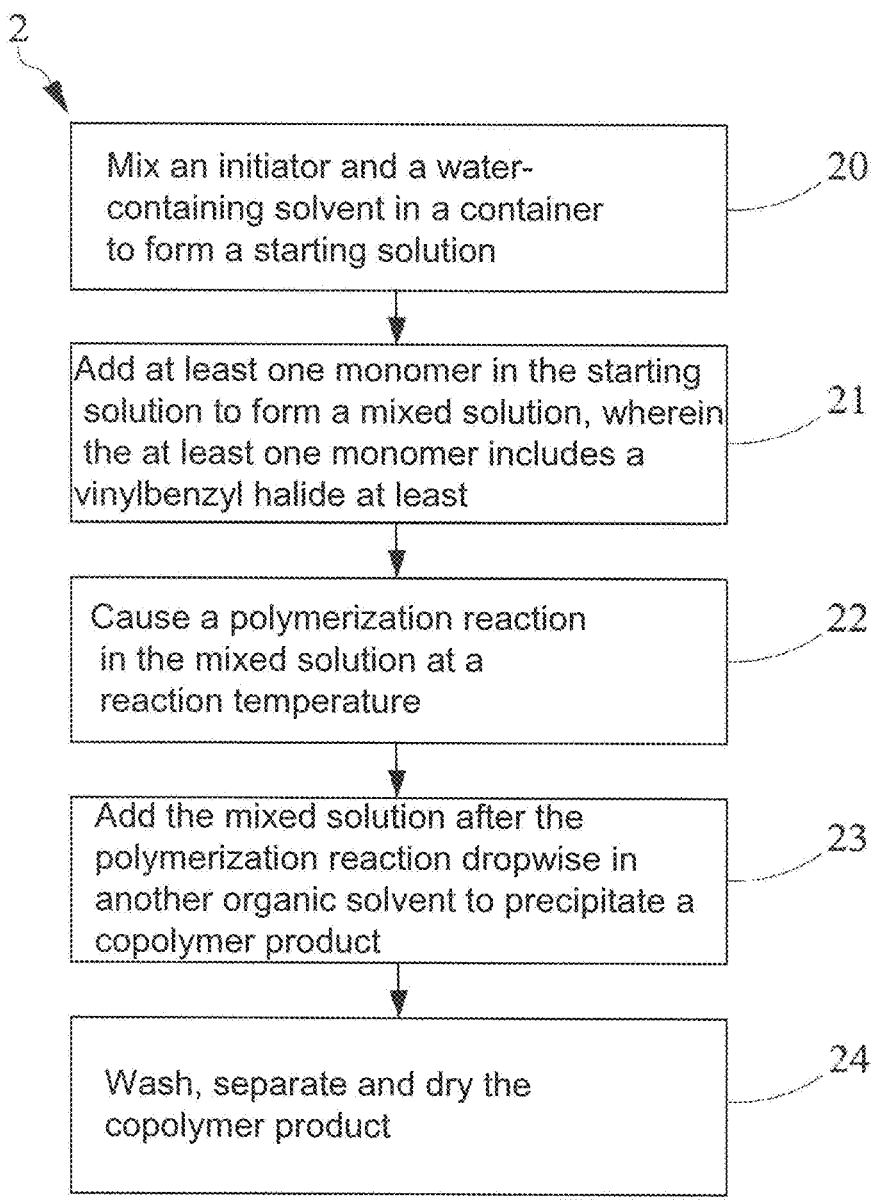
FIG. 1 is a process flow of a method for producing a copolymer according to an embodiment of the invention.

FIG. 1 is a process flow of a method for producing a copolymer according to an embodiment of the invention. The method first includes step 20 in which an initiator is added into a water-containing solvent to form a starting solution. The water-containing solvent is a mixture of water and a first organic solvent (such as ethanol), or is water. Any water-soluble initiator can be used as the initiator, such as 2,2'-azobis(2-methylpropionamidine) dihydrochloride that is shown in formula (3), 4,4'-azobis(4-cyanovaleric acid) that is shown in formula (4), ammonium persulfate (($NH_4$)$_2S_2O_8$), sodium persulfate ($Na_2S_2O_8$), hydroxymethanesulfinic acid monosodium salt dihydrate that is shown in formula (5), or potassium persulfate ($K_2S_2O_8$).

Then, step 21 is performed, in which at least one monomer is added in the starting solution to form a mixed solution, wherein the at least one monomer includes a vinylbenzyl halide. In addition to the vinylbenzyl halide monomer, other monomers such as styrene, methyl methacrylate, or a combination of the two, can also be added, but the invention is not limited thereto. For example, a styrene-based monomer capable of forming the above residue having the proportion y in formula (1) or (2) can be used instead of styrene, and a monomer capable of forming the above residue having the proportion z in formula (1) or (2) can be used instead of methyl methacrylate.

Then, step 22 is performed, in which a polymerization reaction is caused in the mixed solution at a reaction temperature. In this step, an inert gas (such as nitrogen or argon) is filled in the container, the reaction device is put in an oil bath at a temperature, and then the mixed solution is stirred to cause a polymerization reaction. The reaction temperature can be set to a preferred range of about 60° C. to 85° C., but is not limited to the temperature range (a higher temperature requires less polymerization time).

Then, step 23 is performed to precipitate a copolymer product from the mixed solution in a second organic solvent (such as ethanol or methanol) after the polymerization reaction. The species of the $2^{nd}$ organic solvent used in step 23 may be different from or the same as the species the first organic solvent used in step 20.

Lastly, step 24 is performed to wash, separate and dry the copolymer product. The washing step may include dissolving the copolymer in toluene and then precipitating the copolymer in methanol again, and the process may be repeated at least three times to obtain a product having better cleanliness. Then, a solid powder of the copolymer may be obtained by suction filtering and vacuum drying. The solid powder of the copolymer has a structure of formula (1) or (2). It is particularly noted that the difference between the copolymers of formula (1) and formula (2) is that the type of the additional monomer or the type of the organic solvent added in step 21 is different.

Moreover, it is particularly noted that because vinylbenzyl alcohol (VBA) is relatively expensive, obtaining the copolymer of the invention by directly using the vinylbenzyl halide (such as VBC) and VBA as monomers of a copolymerization reaction significantly increases the cost of synthesizing a polymer material and preparing a porous structure. However, in the invention, in the polymerization step of vinylbenzyl halide, the halide is partially hydrolyzed at the same time into VBA, and the partially hydrolyzed VBA is directly copolymerized with the original unhydrolyzed monomer in the reactor to produce the final product, the copolymer having a structure of formula (1) or (2) of the invention.

The copolymer having a chemical structure of formula (1) or (2) can be used to produce a porous structure of the invention, as described below.

Figure 2:
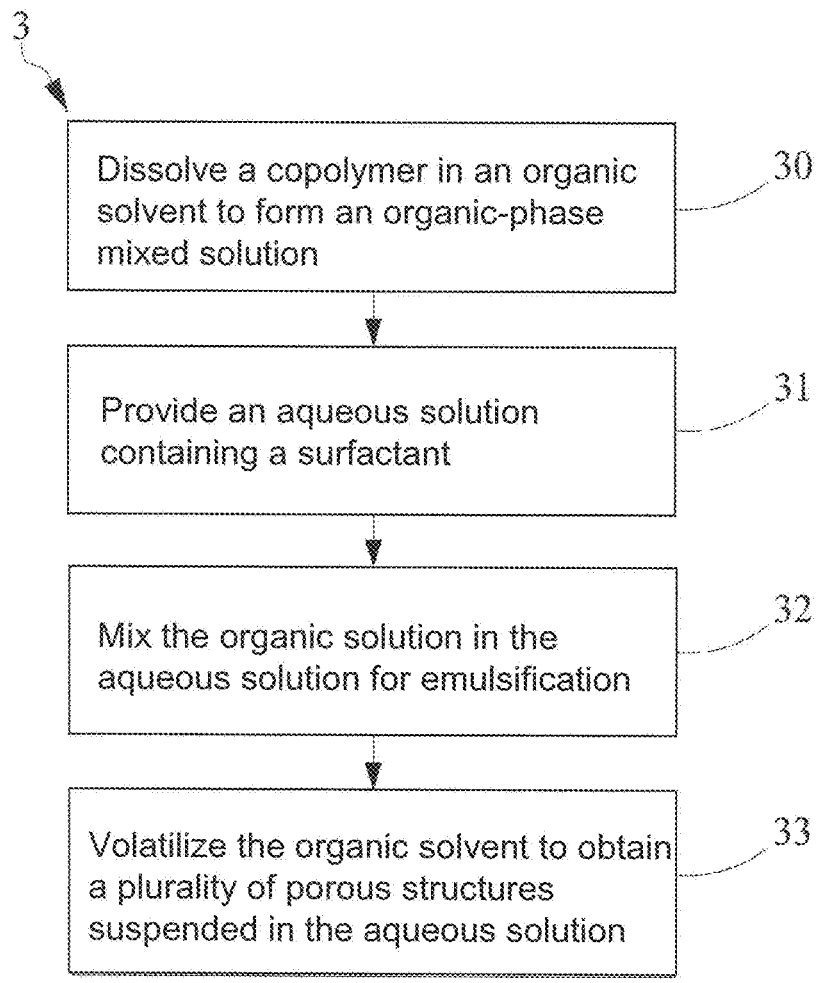
FIG. 2 is a process flow of a method for producing a porous microstructure according to an embodiment of the invention.

FIG. 2 is a process flow of a method for producing a porous microstructure according to an embodiment of the invention. First, step 30 is performed to dissolve a copolymer in an organic solvent to form an organic-phase mixed solution. The copolymer has a chemical structure of formula (1) or (2), the solvent used can be $CH_2Cl_2$ or toluene, but is not limited thereto, and the solvent is selected based on the type of the polymer to be dissolved. Step 31 is then performed, providing an aqueous solution that contains a surfactant. The surfactant may have the chemical structure of formula (10) below, which is exemplified by sodium dodecyl sulfate (SDS).

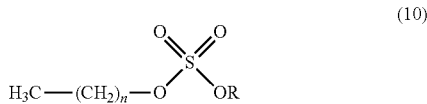

(10)

In formula (10), n is a positive integer, and R is one of sodium ion ($Na^+$), potassium ion ($K^+$), ammonium ion ($NH_4^+$) and $HN^+(C_2H_5OH)_3$. When n=11 and R=$Na^+$, formula (10) represents SDS. When the concentration of SDS exceeds 0.1 wt %, the sphericity and the pore distribution of the resulting porous structure are better. Other examples of the surfactant include poly(N-vinylpyrrolidone) (PVP), sodium dodecylbenzene sulfonate (SDBS), and fatty acid salts, but are not limited thereto.

Then, step 32 is performed to emulsify the organic-phase mixed solution in the aqueous solution. This step mainly consists of pouring the solution of step 30 into the aqueous solution of step 31 and using a homogenizer to perform emulsification for a specific time. As the organic-phase solution containing the copolymer is incompatible with water, a plurality of organic-phase oil droplets each containing the copolymer is formed in the emulsification process. Since the chemical structure of the copolymer carries a hydrophilic VBA residue, the copolymer can carry fine water droplets into the oil droplets in the emulsification process. This is the key factor for forming a porous structure in the invention.

Lastly, step 33 is performed to volatilize the organic solvent to obtain a plurality of porous structures suspended in the aqueous solution. In an embodiment of step 33, a magnet stirrer is mainly used for continuous stirring, and heating is performed at the same time to raise the temperature to a specific value to speed up the volatilization of the solvent. For instance, the temperature is between about 50° C. and about 60° C. (but not limited thereto; a lower operating temperature results in longer time required to volatilize the solvent). After a period of time, white micron porous spheres suspended in the aqueous solution are obtained. Then, after a process of separation by filtering and washing and drying, a solid powder of the porous structure can be obtained. The microspheres prepared by the method have a porous structure, the connectivity between pores is good and the porosity thereof is about 70% to 90%.

Figure 3:
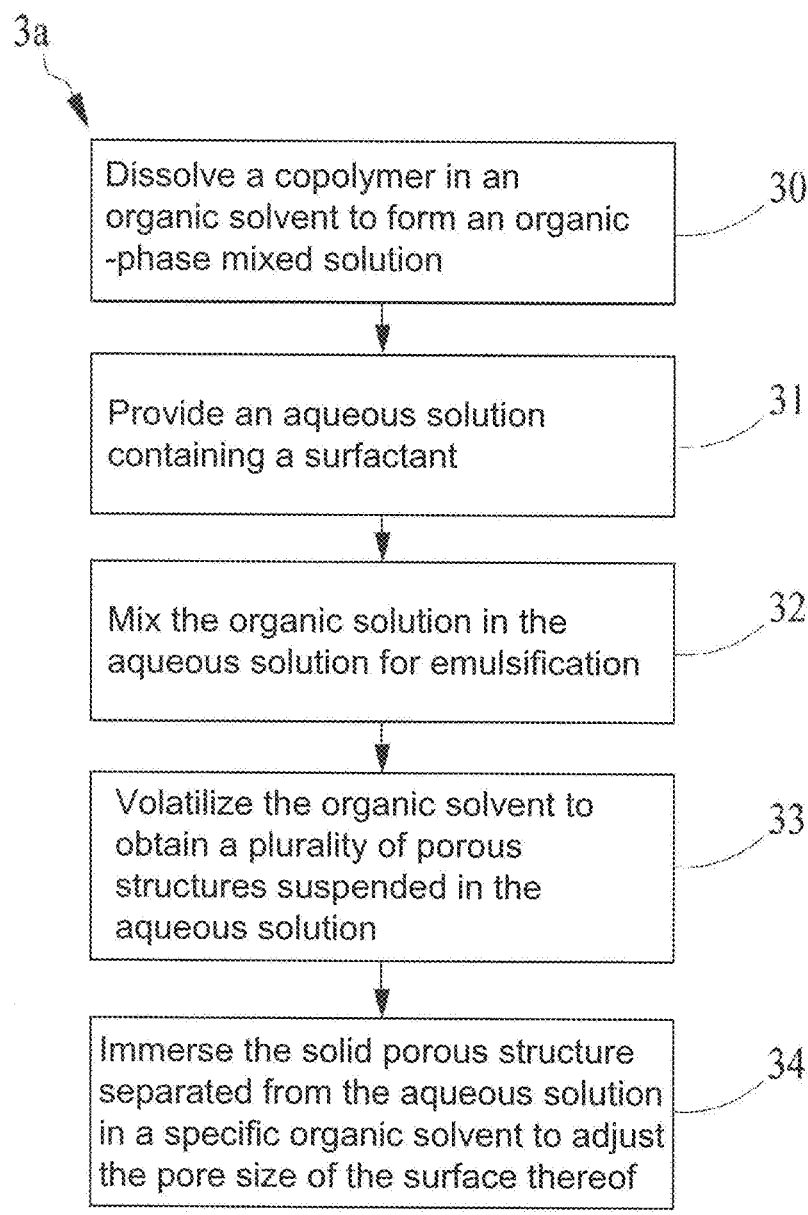
FIG. 3 is a process flow of a method for producing a porous microstructure according to another embodiment of the invention.

Moreover, FIG. 3 is a process flow of a method for producing a porous microstructure according to another embodiment of the invention. The process of this embodiment is similar to that of FIG. 2, and the difference is that after step 33, step 34 is further performed to immerse the porous structure in an organic solvent to adjust the pore size. The organic solvent is possibly an alcoholic solvent such as ethanol. Through immersion in an organic solvent, the pore size and morphology can be adjusted. The pore is enlarged by the immersion, and the size uniformity becomes improved.

In addition, the porous copolymer spheres obtained as above can be carbonized to form porous carbon spheres, which can be used as, for example, a conductive additive for lithium-sulfur batteries, a supercapacitor electrode material, and so on. The carbonization conditions may include: a temperature between 800° C. and 1000° C. under an atmosphere of inert gas. The specific surface area of the porous carbon spheres can reach 650 to 800 $m^2/g$, as measured by the gas adsorption method. The porous carbon sphere can have a particle size of 5 to 25 μm and a pore size of 0.1 μm or larger.

EXAMPLES

The invention will be further described with the following examples, which are however not intended to restrict the scope of the invention.

Synthesis examples of the copolymers of the invention are provided below.

Example 1: Synthesis of poly(vinylbenzyl alcohol-co-vinylbenzyl chloride-co-vinylbenzyl ethyl ether)

0.05 g of 2,2'-azobis(2-methylpropionamidine) dihydrochloride (97%, from Sigma-Aldrich, Saint Louis, USA) as an initiator and 30 mL of water were mixed with 20 mL of ethanol (95%, from Echo, Toufen, Taiwan) in a 100 mL single-neck flask, and then 7.5 mL of the monomer 4-vinylbenzyl chloride (VBC; 90%, from Acros, N.J., USA) was added. The flask opening was sealed, a needle was inserted to introduce nitrogen for 20 min, and then the flask opening was sealed again. The sealed single-neck flask was placed in an oil vessel for an oil bath. During the reaction, the temperature of the oil bath was kept at 75° C., and stirring was performed continuously using a magnet stirrer for 16 hours. After 16 hours, the flask was removed from the oil vessel, and after being cooled to room temperature, the flask was opened, and then the polymerization solution therein was added dropwise into a beaker containing methanol (99.8%, from Grand, Pathum Thani, Thailand) to precipitate. Then, the product in the beaker was separated via a method of suction filtering to obtain a solid polymer powder, and then a copolymer having a molecular weight of about 30,000 g/mole to about 40,000 g/mole was obtained by placing the solid polymer powder in a vacuum oven to remove excess water. The chemical structure of the copolymer is shown in formula (6) below. In particular, the residue of 4-vinylbenzyl ethyl ether is included in formula (6) because ethanol is contained in the aqueous solution of the polymerization reaction so that a part of the monomer 4-vinylbenzyl chloride is reacted into 4-vinylbenzyl ethyl ether and copolymerized with unhydrolyzed VBC and the hydrolyzed part being VBA.

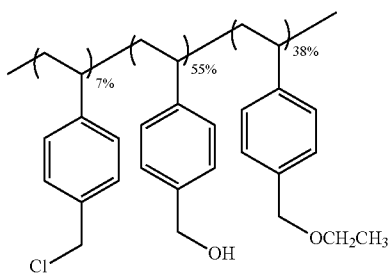

(6)

Example 2: Synthesis of poly(styrene-co-vinylbenzyl alcohol-co-vinylbenzyl chloride-co-vinylbenzyl ethyl ether)

0.05 g of 2,2'-azobis(2-methylpropionamidine) dihydrochloride (97%, from Sigma-Aldrich, Saint Louis, USA) as an initiator and 30 mL of water were mixed with 20 mL of ethanol (95%, from Echo, Toufen, Taiwan) in a 100 mL single-neck flask, and then two monomers were added, which were respectively 2.5 mL of 4-vinylbenzyl chloride (VBC; 90%, Acros, N.J., USA) and 5 mL of styrene (99.5%, from Showa, Tokyo, Japan). The flask opening was sealed, a needle was inserted to introduce nitrogen for 20 min, and then the flask opening was sealed again. The sealed single-neck flask was placed in an oil vessel for an oil bath. During the reaction, the temperature of the oil bath was kept at 75° C., and stirring was continuously performed using a magnet stirrer for 16 hours. After 16 hours, the flask was removed from the oil vessel, and after being cooled to room temperature, the flask was opened, and then the polymerization solution therein was added dropwise in a beaker containing methanol (99.8%, from Grand, Pathum Thani, Thailand) to precipitate. Then, the product in the beaker was separated by suction filtering to obtain a solid polymer powder, and then a copolymer having the chemical structure of formula (7) was obtained by placing the solid polymer powder in a vacuum oven to remove excess water.

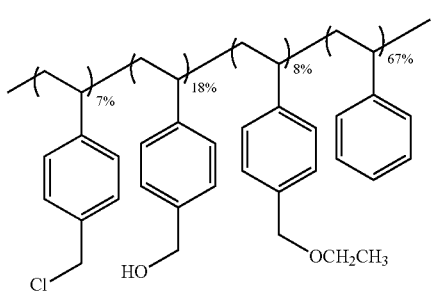

(7)

Example 3: Synthesis of poly(styrene-co-vinylbenzyl alcohol-co-vinylbenzyl chloride-co-vinylbenzyl ethyl ether-co-methyl methacrylate)

0.05 g of 2,2'-azobis(2-methylpropionamidine) dihydrochloride (97%, from Sigma-Aldrich, Saint Louis, USA) as an initiator and 30 mL of water were mixed with 20 mL of ethanol (95%, from Echo, Toufen, Taiwan) in a 100 mL single-neck flask, and then three monomers were added, which were respectively 2.5 mL of 4-vinylbenzyl chloride (VBC; 90%, from Acros, N.J., USA), 2.5 mL of styrene (99.5%, from Showa, Tokyo, Japan), and 2.5 mL of methyl methacrylate (MMA; 99%, Sigma-Aldrich, Zwijndrecht, Netherlands). Then, the flask opening was sealed, a needle was inserted to introduce nitrogen for 20 min, and then the opening was sealed again. The sealed single-neck flask was placed in an oil vessel for an oil bath. During the reaction, the temperature of the oil bath was kept at 75° C., and stirring was performed continuously using a magnet stirrer for 16 hours. After 16 hours, the flask was removed from the oil vessel, and after being cooled to room temperature, the flask was opened, and then the polymerization solution therein was added dropwise in a beaker containing methanol (99.8%, from Grand, Pathum Thani, Thailand) to precipitate. Then, the product in the beaker was separated by suction filtering to obtain a solid polymer powder, and then a copolymer having the chemical structure of formula (8) was obtained by placing the solid polymer powder in a vacuum oven to remove excess water.

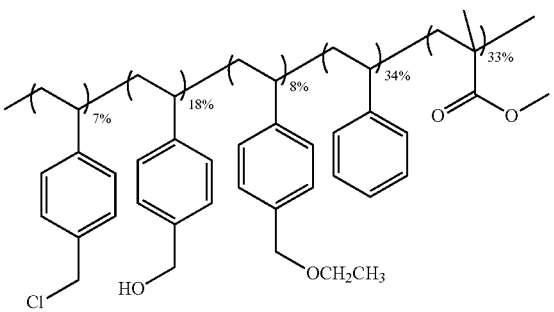

(8)

Example 4: Synthesis of poly(vinylbenzyl alcohol-co-vinylbenzyl chloride)

0.05 g of 2,2'-azobis(2-methylpropionamidine) dihydrochloride (97%, from Sigma-Aldrich, Saint Louis, USA) as an initiator and 50 mL of water were mixed in a 100 mL single-neck flask. Then, 7.5 mL of 4-vinylbenzyl chloride (VBC; 90%, from Acros, N.J., USA) as a monomer was added. Then, the flask opening was sealed, a needle was inserted to introduce nitrogen for 20 min, and then the opening was sealed again. The sealed single-neck flask was placed in an oil vessel for an oil bath. During the reaction, the temperature of the oil bath was kept at 80° C., and stirring was performed continuously using a magnet stirrer for a period of time. The time was 16 hours in this embodiment, but is not limited thereto. After 16 hours, the flask was removed from the oil vessel, and after being cooled to room temperature, the flask was opened, and the polymerization solution therein was added dropwise in a beaker containing methanol (99.8%, Grand, Pathum Thani, Thailand) to precipitate. Lastly, the solid product in the beaker was separated by suction filtering, and then the solid powder of a copolymer was obtained by placing the solid product in a vacuum oven to remove excess water. The copolymer has the chemical structure of formula (9).

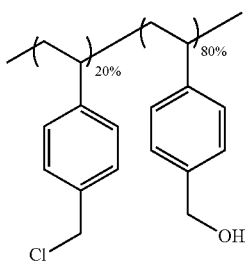

(9)

Example 5: Synthesis of poly(vinylbenzyl alcohol-co-vinylbenzyl chloride-co-vinylbenzyl ethyl ether)

0.05 g of 2,2'-azobis(2-methylpropionamidine) dihydrochloride (97%, from Sigma-Aldrich, Saint Louis, USA) as an initiator, 30 mL of water, and 20 mL of ethanol (95%, from Echo, Toufen, Taiwan) were mixed in a 100 mL single-neck flask. Then, 7.5 mL of 4-vinylbenzyl chloride (VBC; 90%, from Acros, N.J., USA) as a monomer was added. Then, the flask opening was sealed, a needle was inserted to introduce nitrogen for 20 min, and then the opening was sealed again. The sealed single-neck flask was placed in an oil vessel for an oil bath. During the reaction, the temperature of the oil bath was kept at 75° C., and stirring was performed continuously using a magnet stirrer for 1.5 hours. After 1.5 hours, the flask was removed from the oil vessel, and after being cooled to room temperature, the flask was opened, and the polymerization solution therein was added dropwise in a beaker containing methanol (99.8%, Grand, Pathum Thani, Thailand) to precipitate. Lastly, the solid product in the beaker was separated by suction filtering, and then the solid powder of a copolymer was obtained by placing the solid product in a vacuum oven to remove excess water. The copolymer has a chemical structure containing 74% of the residue of vinylbenzyl chloride, 18% of the residue of vinylbenzyl alcohol, and 8% of the residue of vinylbenzyl ethyl ether.

Example 6: Synthesis of poly(styrene-co-vinylbenzyl alcohol-co-vinylbenzyl chloride-co-vinylbenzyl ethyl ether-co-methyl methacrylate)

0.05 g of 2,2'-azobis(2-methylpropionamidine) dihydrochloride (97%, from Sigma-Aldrich, Saint Louis, USA) as an initiator, 30 mL of water, and 20 mL of ethanol (95%, from Echo, Toufen, Taiwan) were mixed in a 100 mL single-neck flask, and then three monomers were added, which were respectively 2.5 mL of 4-vinylbenzyl chloride (VBC; 90%, from Acros, N.J., USA), 1.5 mL of styrene (99.5%, from Showa, Tokyo, Japan), and 3.5 mL of methyl methacrylate (MMA; 99%, Sigma-Aldrich, Zwijndrecht, Netherlands). Then, the flask opening was sealed, a needle was inserted to introduce nitrogen for 20 min, and then the opening was sealed again. The sealed single-neck flask was placed in an oil vessel for an oil bath. During the reaction, the temperature of the oil bath was kept at 75° C., and stirring was performed continuously using a magnet stirrer for 16 hours. After 16 hours, the flask was removed from the oil vessel, and after being cooled to room temperature, the flask was opened, and then the polymerization solution therein was added dropwise in a beaker containing methanol (99.8%, from Grand, Pathum Thani, Thailand) to precipitate. Then, the product in the beaker was separated by suction filtering to obtain a solid polymer powder, and then a copolymer was obtained by placing the solid polymer powder in a vacuum oven to remove excess water. The copolymer has a chemical structure containing 7% of the residue of vinylbenzyl chloride, 18% of the residue of vinylbenzyl alcohol, 8% of the residue of vinylbenzyl ethyl ether, 17% of the residue of styrene, and 50% of the residue of methyl methacrylate.

Example 7: Synthesis of poly(vinylbenzyl alcohol-co-vinylbenzyl chloride)

0.05 g of 2,2'-azobis(2-methylpropionamidine) dihydrochloride (97%, from Sigma-Aldrich, Saint Louis, USA) as an initiator, and 50 mL of water were mixed in a 100 mL single-neck flask. Then, 7.5 mL of 4-vinylbenzyl chloride (VBC; 90%, from Acros, N.J., USA) as a monomer was added. Then, the flask opening was sealed, a needle was inserted to introduce nitrogen for 20 min, and then the opening was sealed again. The sealed single-neck flask was placed in an oil vessel for an oil bath. During the reaction, the temperature of the oil bath was kept at 75° C., and stirring was performed continuously using a magnet stirrer for 5 hours. After 5 hours, the flask was removed from the oil vessel, and after being cooled to room temperature, the flask was opened, and then the polymerization solution therein was added dropwise in a beaker containing methanol (99.8%, from Grand, Pathum Thani, Thailand) to precipitate. Then, the product in the beaker was separated by suction filtering to obtain a solid polymer powder, and then a copolymer was obtained by placing the solid polymer powder in a vacuum oven to remove excess water. The copolymer has a chemical structure containing 56% of the residue of vinylbenzyl chloride, and 44% of the residue of vinylbenzyl alcohol.

Example 8: Synthesis of poly(vinylbenzyl alcohol-co-vinylbenzyl chloride-co-vinylbenzyl ethyl ether-co-vinyl laurate)

0.05 g of 2,2'-azobis(2-methylpropionamidine) dihydrochloride (97%, from Sigma-Aldrich, Saint Louis, USA) as an initiator, 30 mL of water, and 20 mL of ethanol (95%, from Echo, Toufen, Taiwan) were mixed in a 100 mL single-neck flask, and then two monomers were added, which were respectively 5.0 mL of 4-vinylbenzyl chloride (VBC; 90%, from Acros, N.J., USA), and 2.5 mL of vinyl laurate (>99%, TCI, Tokyo, Japan). Then, the flask opening was sealed, a needle was inserted to introduce nitrogen for 20 min, and then the opening was sealed again. The sealed single-neck flask was placed in an oil vessel for an oil bath. During the reaction, the temperature of the oil bath was kept at 75° C., and stirring was performed continuously using a magnet stirrer for 16 hours. After 16 hours, the flask was removed from the oil vessel, and after being cooled to room temperature, the flask was opened, and then the polymerization solution therein was added dropwise in a beaker containing methanol (99.8%, from Grand, Pathum Thani, Thailand) to precipitate. Then, the product in the beaker was separated by suction filtering to obtain a solid polymer powder, and then a copolymer was obtained by placing the solid polymer powder in a vacuum oven to remove excess water. The copolymer has a chemical structure containing 7% of the residue of vinylbenzyl chloride, 55% of the residue of vinylbenzyl alcohol, 8% of the residue of vinylbenzyl ethyl ether, and 30% of the residue of vinyl laurate.

<Porous Structure>

Example 9

0.1 g of the copolymer obtained from Example 2 that satisfies formula (2) of y≠0 and z=0 was dissolved in 1.2 g of toluene (100%, from Mallinckrodt, USA). 40 mL of an aqueous solution in which a surfactant was dissolved in a suitable concentration (such as 0.3 wt % for SDS) was prepared, the organic-phase solution in which the polymer was dissolved was poured into the SDS aqueous solution, and then emulsification was performed using a homogenizer at a rotation speed of 3,400 rpm for 2 min. After 2 min, stirring was continued using a magnet stirrer, and heating was performed at the same time to raise the temperature to 55° C. After about 1 hour when toluene was gradually volatilized and the polymer therein was solidified, white micron porous spheres were obtained. It should be mentioned that, when the concentration range of the surfactant is greater than 0.1 wt %, the pore distribution of the resulting porous structure is more uniform.

Figure 4:
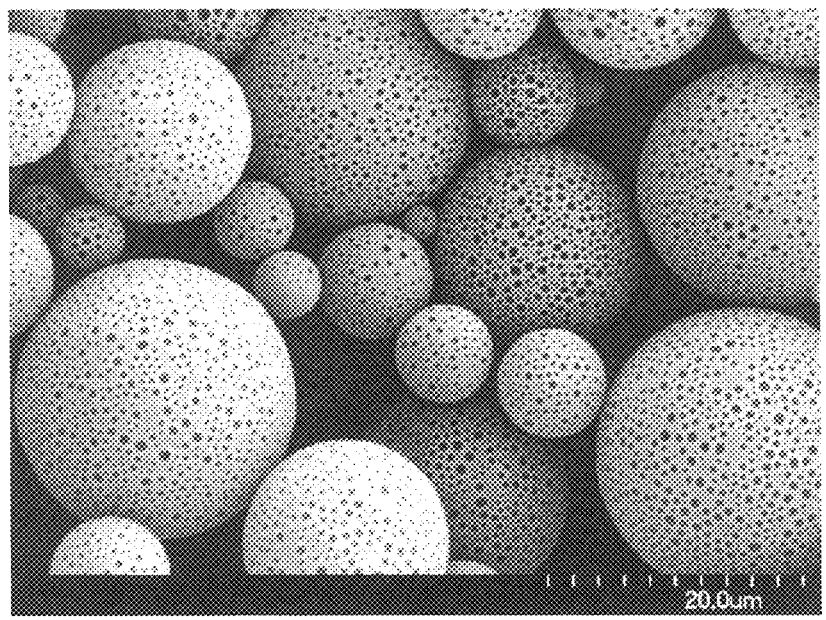
FIGS. 4 to 6 are images of the porous structures of Examples 9 to 11 of the invention under an electron microscope.

An image of the obtained porous structures under an electron microscope is shown in FIG. 4. In the invention, porous microspheres having different pore sizes can be obtained by simply controlling the emulsification time and the amount of the polymer, solvent or surfactant, etc.

Example 10

The copolymer of Example 3 that satisfies formula (2) of y≠0 and z≠0 was treated as in Example 9 to obtain porous structures.

Figure 5:
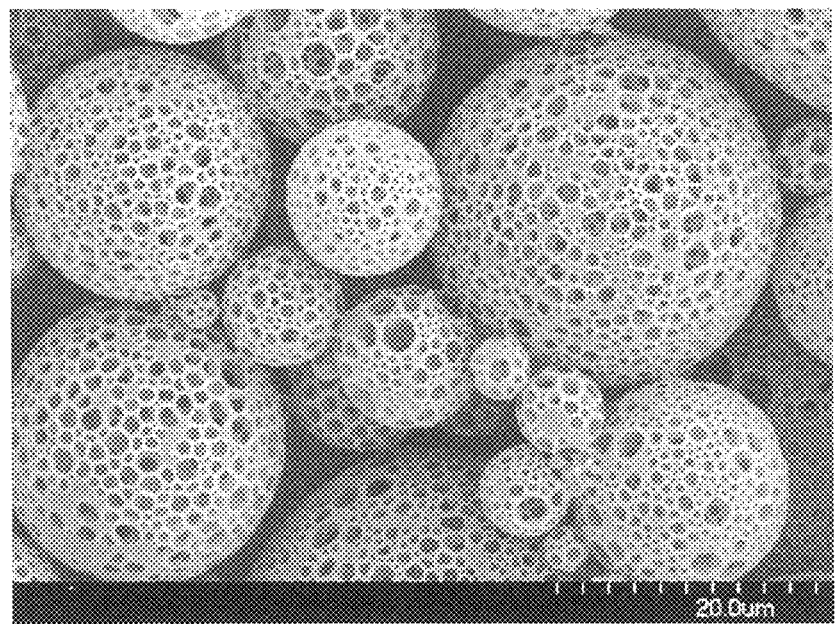

An image of the obtained porous structures under an electron microscope is shown in FIG. 5. It is known from FIG. 5 that the pore size of the porous structure can be greater when the residue of methyl methacrylate or the like monomer is included, and that the copolymer of Example 3 can form a symmetric porous microsphere, of which the particle size is in the range of 2 to 25 μm and the pore size is about 0.5 μm or larger.

Example 11

0.1 g of the copolymer powder prepared from Example 4 that satisfies formula (1) of y=0 and z=0 was dissolved in 2.2 g of dichloromethane. A surfactant solution having a suitable concentration was prepared, such as an aqueous solution containing 0.3 wt % of SDS (99%, from Acros, N.J.). The solution in which the copolymer was dissolved was poured into the SDS aqueous solution, and emulsification was performed using a homogenizer at a rotation speed of 3,400 rpm for 2 min. After 2 min, stirring was continued using a magnet stirrer, and heating was performed at the same time to increase the temperature to 55° C. After about 1 hour, dichloromethane was gradually volatilized, and when the polymer therein was solidified, white micron porous spheres were obtained. It should be mentioned that, when the concentration range of the surfactant is greater than 0.1 wt %, the pore distribution of the resulting porous structure is more uniform.

Figure 6:
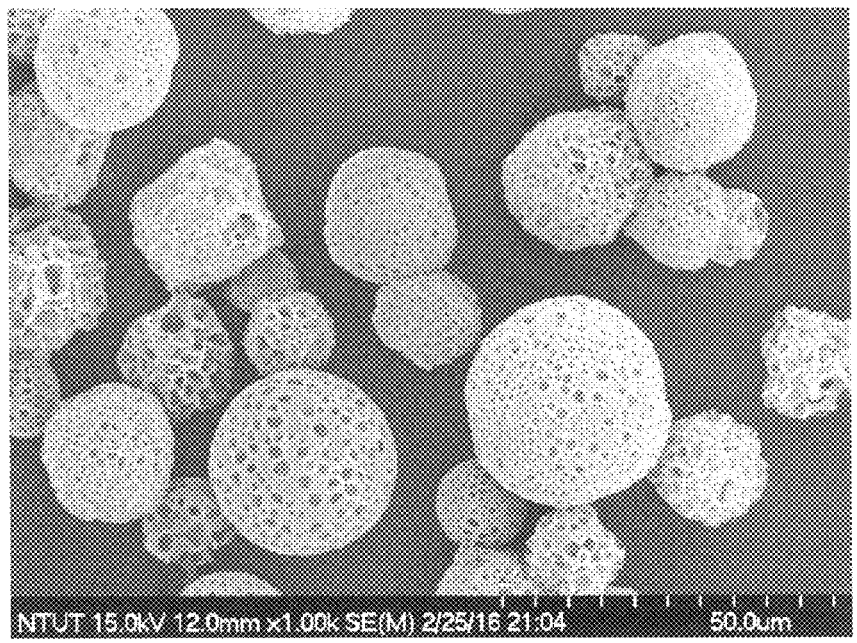

An image of the obtained porous structures under an electron microscope is shown in FIG. 6.

Example 12

The copolymer of Example 5 was treated as in Example 9 to obtain porous structures.

Figure 7:
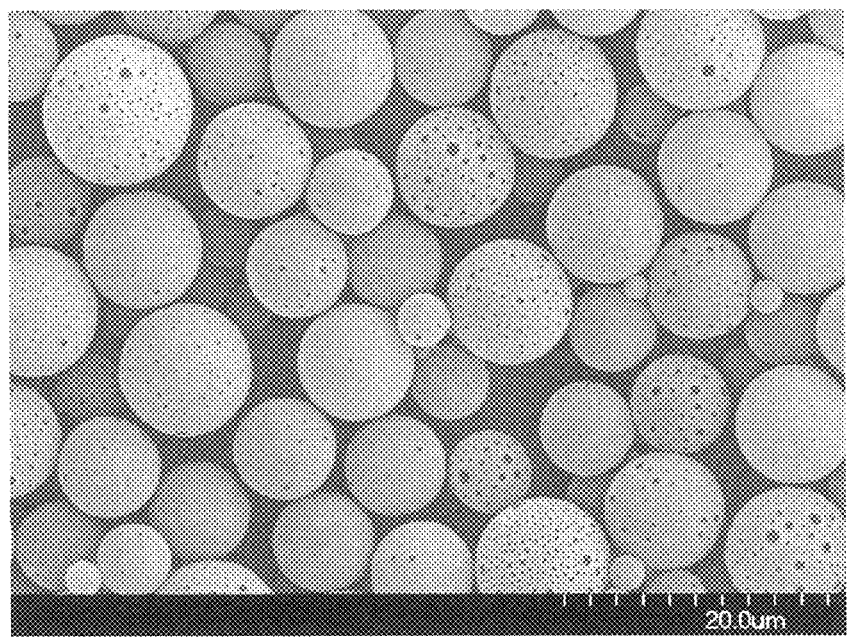
FIGS. 7 to 10 are images of the porous structures of Examples 12 to 15 of the invention under an electron microscope.

An image of the obtained porous structures under an electron microscope is shown in FIG. 7. It is known from FIG. 7 that the particle size was 1-15 μm and the average pore size was larger than 0.1 μm, wherein all particles were porous although some did not exhibit pores on the surface.

Example 13

The copolymer of Example 6 was treated as in Example 9 to obtain porous structures.

Figure 8:
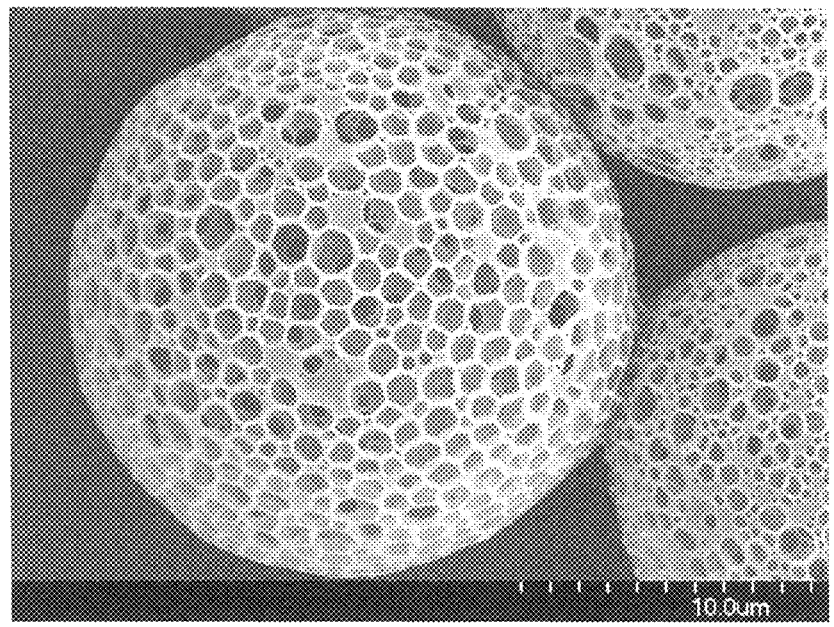

An image of the obtained porous structures under an electron microscope is shown in FIG. 8. It is known from FIG. 8 that the particle size was 5-25 μm and the average pore size was larger than 0.2 μm, wherein some particles were not in a completely spherical morphology.

Example 14

The copolymer of Example 7 was treated as in Example 9 to obtain porous structures.

Figure 9:
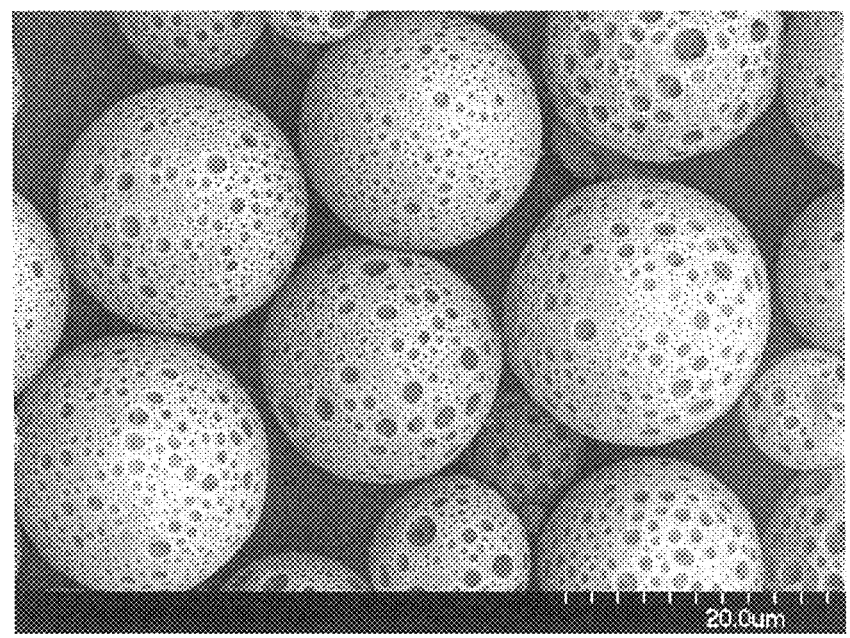

An image of the obtained porous structures under an electron microscope is shown in FIG. 9. It is known from FIG. 9 that the particle size was 2-20 μm and the average pore size was larger than 0.2 μm.

Example 15

The copolymer of Example 8 was treated as in Example 9 to obtain porous structures.

Figure 10:
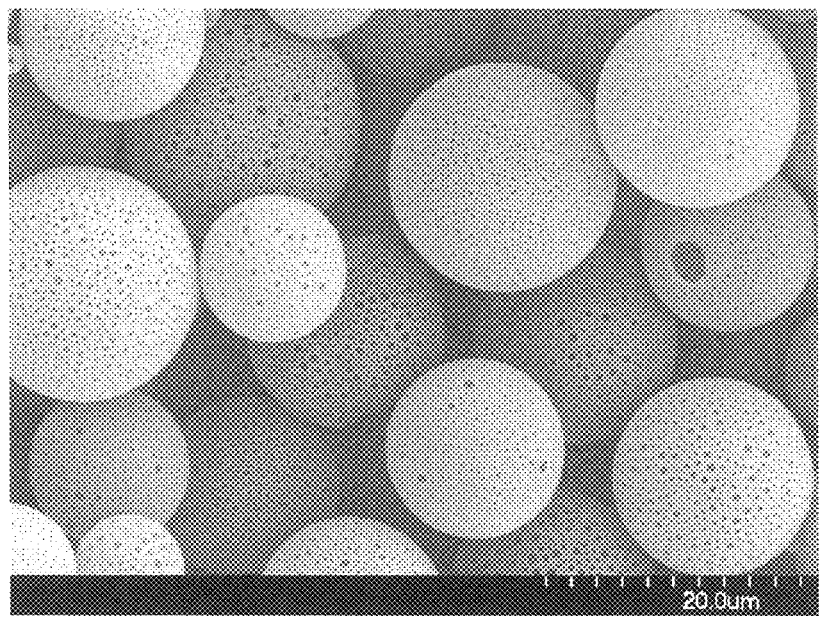

An image of the obtained porous structures under an electron microscope is shown in FIG. 10. It is known from FIG. 10 that the particle size was 2-20 μm and the average pore size was larger than 0.1 μm.

<Immersion-Treated Porous Structure>

Example 16

Figure 11:
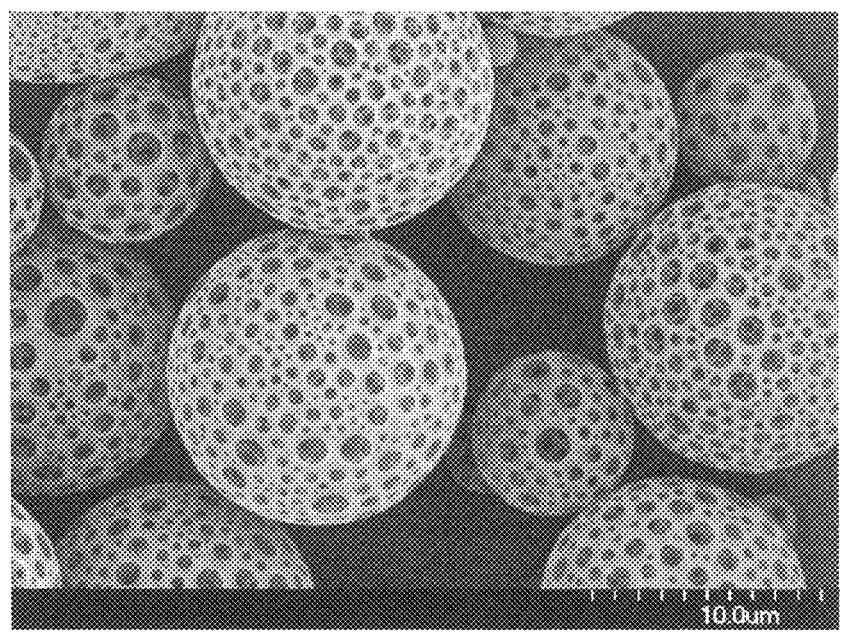
FIG. 11 is an image of the porous structure of Example 16 obtained by immersing the porous microstructure of Example 9 in ethanol.

The porous microsphere of Example 9 (FIG. 4), which was made from the copolymer of Example 2, was immersed in ethanol at room temperature for 2 hours. The morphology of the product is shown in FIG. 11. It is known from Example 9/FIG. 4 and FIG. 11 that the pore size was enlarged and the pore size uniformity improved by the immersion.

<Porous Carbon Sphere>

Example 17

Figure 12:
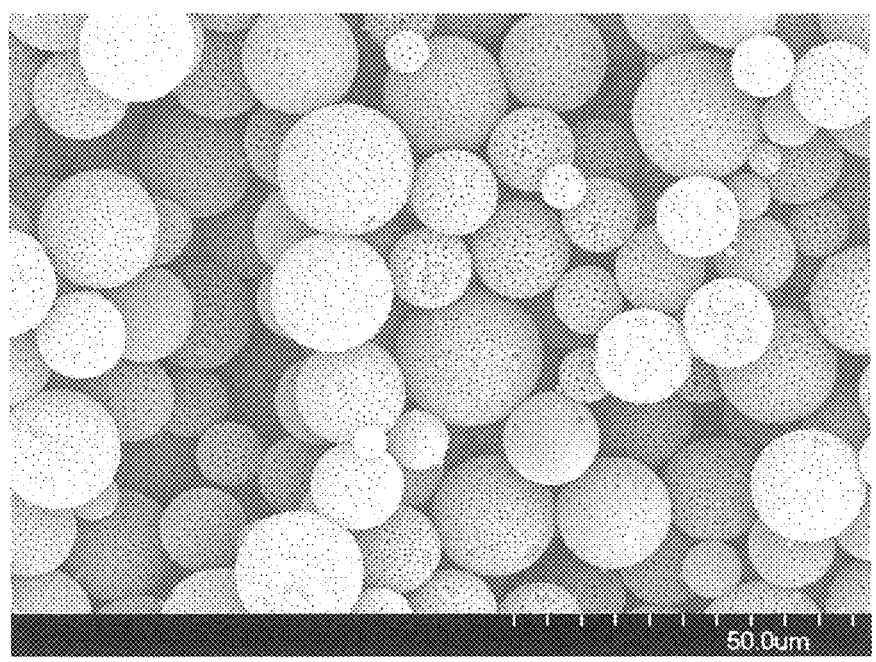
FIG. 12 is an image of the porous carbon spheres of Example 17 that were formed by carbonizing the spherical porous microstructures of Example 16.

For carbonization, the porous microsphere of Example 16 was pretreated by immersion in a warm concentrated sulfuric acid (95-97%, Scharlau, Sentmenat, Spain) for 1 h. Then, the acid-treated powder was washed repeatedly with deionized water and separated from the supernatant for drying. Next, the powder was placed in a quartz furnace saturated with inert gas, such as nitrogen or argon, and heated from room temperature to 850° C. at a rate of 10 OC/min. Finally, a black porous carbon powder was obtained. An image of the porous carbon spheres is shown in FIG. 12. The specific surface area, the particle size and the pore size of the porous carbon spheres were measured to be about 800 m$^2$/g, 2-20 μm, and >0.1 μm, respectively.

The method of preparing a porous structure in the invention can be performed using general homogenization or emulsification equipment (such as a homogenizer or a general mechanical blade mixer) that is easy to operate. Thereby, porous microspheres can be rapidly prepared in large quantity without using a porogen or a template method.

Therefore, the method of preparing a porous structure of the invention has the potential of scaling up the production process for mass production. Moreover, the above process can be performed under normal temperature and pressure by directly using the copolymer material of the invention to prepare a porous structure having high pore uniformity and a complete sphere morphology. As a result, the need to consider both of the trivial items and operations relating to the polymerization reaction (such as the chemical compositions and parameters) and the control of the polymerization reaction in the process of preparing a porous structure in the prior art can be omitted. Moreover, regarding the microspheres formed by the polymer of the invention, the pore distribution and the size thereof can be readily adjusted in the homogenization process by simply changing process parameters (such as the proportions of polymer, solvent, and surfactant). The method of the invention is simpler than conventional methods for preparing porous microspheres, and can be easily used by one without a chemistry-related background.

This invention has been disclosed above in the preferred embodiments, but is not limited to those. It is known to persons skilled in the art that some modifications and innovations may be made without departing from the spirit and scope of this invention. Hence, the scope of this invention should be defined by the following claims.

What is claimed is:

1. A copolymer having a chemical structure of formula (1), wherein

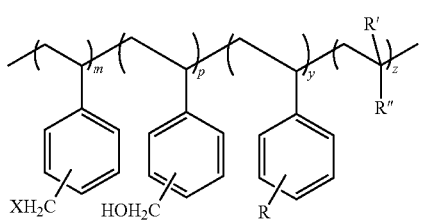

a number-average molecular weight of the copolymer is 120,000 g/mole or less,
m is greater than 0, $8\% \leq p \leq 80\%$, $y \geq 0$, and $z \geq 0$,
X is selected from —Cl, —Br, and —I, and
R is selected from hydrogen (—H), —Cl, —Br, —$C_nH_{2n+1}$, —$CH_2OC_nH_{2n+1}$, —$CH_2NH_2$, —$CH_2C(=O)OC_iH_{2i+1}$, —$CH_2OC(=O)C_nH_{2n+1}$, —$NH_2$, —$N(C_iH_{2i+1})C(=O)C_nH_{2n+1}$, —$C(=O)OC_iH_{2i+1}$, —$OC(=O)C_nH_{2n+1}$, —$SO_3M$ (wherein M is selected from —H, Na, —K, and —$NH_4$), and —$Si(OC_nH_{2n+1})_3$, R' is selected from —H, —OH and —$C_nH_{2n+1}$, R" is selected from —H, —$C(=O)OC_jH_{2j+1}$, —$OC(=O)C_kH_{2k+1}$, —$C\equiv N$, —$Si(OC_nH_{2n+1})_3$, —$NH_2$, —$N(C_iH_{2i+1})C(=O)C_nH_{2n+1}$, —$NC_4H_6O$ (pyrrolidonyl), and —$C_6H_5N$ (pyridinyl), wherein n=1 to 4, i=0 to 4, j=1 to 12, and k=1 to 17.

2. The copolymer of claim 1, wherein $15\% \leq p \leq 65\%$.

3. The copolymer of claim 1, wherein the number-average molecular weight is 55,000 g/mole or less.

4. A porous structure, having a body that has a plurality of pores and comprises the copolymer of claim 1.

5. The porous structure of claim 4, wherein the porous structure is a spherical structure.

6. A copolymer having a chemical structure of formula (2), wherein

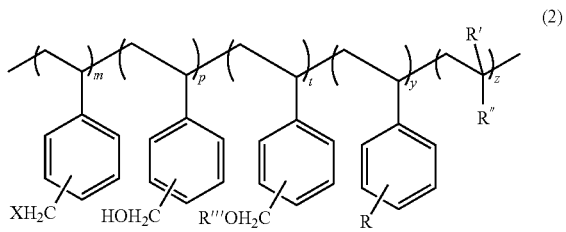

a number-average molecular weight of the copolymer is 120,000 g/mole or less,
in and t are both greater than 0, $8\% \leq p \leq 80\%$, $y \geq 0$, and $z \geq 0$,
X is selected from —Cl, —Br, and —I,
R is selected from hydrogen (—H), —Cl, —Br, —$C_nH_{2n+1}$, —$CH_2NH_2$, —$CH_2C(=O)OC_iH_{2i+1}$, —$CH_2OC(=O)C_nH_{2n+1}$, —$NH_2$, —$N(C_iH_{2i+1})C(=O)C_nH_{2n+1}$, —$C(=O)OC_iH_{2i+1}$, —$OC(=O)C_nH_{2n+1}$, —$SO_3M$ (wherein M is selected from —H, Na, —K and —$NH_4$), and —$Si(OC_nH_{2n+1})_3$, R' is selected from —H, —OH and —$C_nH_{2n+1}$, R" is selected from —H, —$C(=O)OC_jH_{2j+1}$, —$OC(=O)C_kH_{2k+1}$, —$C\equiv N$, —$Si(OC_nH_{2n+1})_3$, —$NH_2$, —$N(C_iH_{2i+1})C(=O)C_nH_{2n+1}$, —$NC_4H_6O$ (pyrrolidonyl), and —$C_6H_5N$ (pyridinyl), wherein R''' is —$C_nH_{2n+1}$, wherein n=1 to 4, i=0 to 4, j=1 to 12, and k=1 to 17.

7. A porous structure, having a body that has a plurality of pores and comprises the copolymer of claim 6.

8. The porous structure of claim 7, wherein the porous structure is a spherical structure.

9. A method for producing a copolymer, comprising:
mixing a water-soluble initiator and a water-containing solvent in a container to form a starting solution;
adding at least one monomer in the starting solution to form a mixed solution, wherein the at least one monomer comprises a vinylbenzyl halide;
causing a polymerization reaction in the mixed solution at a reaction temperature; and
precipitating, in an organic solvent, a product of the polymerization reaction from the mixed solution.

10. The method of claim 9, wherein the water-soluble initiator is selected from 2,2'-azobis(2-methylpropionamidine) dihydrochloride, 4,4'-azobis(4-cyanovaleric acid), ammonium persulfate (($NH_4)_2S_2O_8$), sodium persulfate ($Na_2S_2O_8$), potassium persulfate ($K_2S_2O_8$), and hydroxymethanesulfinic acid monosodium salt dihydrate.

11. The method of claim 9, wherein the water-containing solvent further contains ethanol or isopropanol.

12. The method of claim 9, wherein the at least one monomer further comprises styrene, methyl methacrylate, vinyl laurate, or a combination thereof.

13. A method for producing a porous structure, comprising:
dissolving a copolymer in an organic solvent to form a mixed solution;
providing an aqueous solution containing a surfactant;
emulsifying the organic mixed solution in the aqueous solution; and
heating to remove the organic solvent in the emulsified emulsion to naturally form a plurality of porous structures,
wherein the copolymer comprises a copolymer of claim 1.

14. The method of claim 13, wherein the porous structure is a spherical structure.

15. The method of claim 13, further comprising a step of immersing the porous structure in an organic solvent to adjust a pore size.

16. A porous carbon sphere, being formed by carbonizing the spherical structure of claim 14, having a particle size of 5 to 25 micrometers and a pore size of 0.1 micrometer or more.

17. A porous carbon sphere, being formed by carbonizing the spherical structure of claim 15, having a particle size of 5 to 25 micrometers and a pore size of 0.1 micrometer or more.

18. A method for producing a porous structure, comprising:
dissolving a copolymer in an organic solvent to form a mixed solution;
providing an aqueous solution containing a surfactant;
emulsifying the organic mixed solution in the aqueous solution; and
heating to remove the organic solvent in the emulsified emulsion to naturally form a plurality of porous structures,
wherein the copolymer comprises a copolymer of claim 6.

19. The method of claim 18, wherein the porous structure is a spherical structure.

20. The method of claim 18, further comprising a step of immersing the porous structure in an organic solvent to adjust a pore size.

21. A porous carbon sphere, being formed by carbonizing the spherical structure of claim 19, having a particle size of 5 to 25 micrometers and a pore size of 0.1 micrometer or more.

22. A porous carbon sphere, being formed by carbonizing the spherical structure of claim 20, having a particle size of 5 to 25 micrometers and a pore size of 0.1 micrometer or more.

* * * * *